United States Patent [19]
Isono et al.

[11] Patent Number: 6,106,081
[45] Date of Patent: Aug. 22, 2000

[54] RUNNING STABILITY CONTROL DEVICE OF AUTOMOBILE BY UNIFYING RATIO OF LONGITUDINAL/LATERAL FORCE TO VERTICAL LOAD AT EACH WHEEL

[75] Inventors: Hiroshi Isono; Masashi Ohta, both of Susono, Japan

[73] Assignee: Toyota Jidosha Kabushiki Kaisha, Toyota, Japan

[21] Appl. No.: 09/081,463

[22] Filed: May 19, 1998

[30] Foreign Application Priority Data

May 20, 1997 [JP] Japan ................................ 9-145835

[51] Int. Cl.⁷ .................................................. B60T 8/62
[52] U.S. Cl. ........................... 303/188; 303/198; 303/167; 303/9.69
[58] Field of Search ..................... 303/167, 188, 303/148, 146, 198, 194, 195, 196, 150

[56] References Cited

U.S. PATENT DOCUMENTS

| | | | |
|---|---|---|---|
| 5,320,422 | 6/1994 | Tsuyama et al. | 303/150 |
| 5,551,771 | 9/1996 | Akuzawa et al. | 303/188 |
| 5,707,120 | 1/1998 | Monzaki et al. | 303/146 |
| 5,717,591 | 2/1998 | Okada et al. | 364/426.024 |
| 5,732,371 | 3/1998 | Fujita | 303/146 |
| 5,762,157 | 6/1998 | Uehara | 303/148 |
| 5,769,510 | 6/1998 | Akuzawa et al. | 303/188 |
| 5,882,092 | 3/1999 | Koibuchi | 303/146 |

FOREIGN PATENT DOCUMENTS

| | | |
|---|---|---|
| 59-156848 | 9/1984 | Japan . |
| 62-175248 | 7/1987 | Japan . |
| 63-38064 | 2/1988 | Japan . |
| 1-237252 | 9/1989 | Japan . |
| 3-273948 | 2/1991 | Japan . |
| 9-2222 | 1/1997 | Japan . |
| 9-240460 | 9/1997 | Japan . |

*Primary Examiner*—Robert J. Oberleitner
*Assistant Examiner*—Mariano Sy
*Attorney, Agent, or Firm*—Kenyon & Kenyon

[57] ABSTRACT

In a running stability control device of an automobile having front right, front left, rear right and rear left wheels, and a brake system for selectively braking each of said wheels separately, the control device estimates a ratio of a longitudinal force to a vertical load acting at each of the front right, front left, rear right and rear left wheels, and operates the brake system so as to make said ratio of each of the front right, front left, rear right and rear left wheels be substantially equal to one another.

9 Claims, 13 Drawing Sheets

RUNNING STABILITY CONTROL DEVICE OF AUTOMOBILE BY UNIFYING RATIO OF LONGITUDINAL/LATERAL FORCE TO VERTICAL LOAD AT EACH WHEEL

BACKGROUND OF THE INVENTION

1. Field of the Invention

The present invention relates to a running stability control device of an automobile having front right, front left, rear right and rear left wheels, and a brake system for separately braking each of the wheels, wherein the running stability control device makes a control calculation based upon information with regard to the running conditions of the vehicle and automatically controls the brake system so as to apply a controlled braking to each of the wheels for the purpose of improving a running stability of the automobile.

2. Description of the Prior Art

Various inventions have been made and applied for patents in the art of applying a computer controlled braking to a selected one or ones of the front right, front left, rear right and rear left wheels of an automobile to improve running performance of the automobile from various view points, as described in, for example, Japanese Patent Laid-open Publication 8-80823 (corr. to U.S. Pat. No. 5,717,591), Japanese Patent Laid-open Publication 9-109851 (corr. to U.S. Pat. No. 5,707,120) and Japanese Patent Laid-open Publication 9-99821 (corr. to U.S. patent application 08/723,757).

In those prior inventions, a parameter indicating a liability of the automobile to an instability of running behavior such as a spin or a driftout is estimated by an electronic computer based upon a parameter or parameters representative of certain running conditions of the automobile, and a brake system is operated so as to apply a computer controlled braking to a selected one or ones of the front right, front left, rear right and rear left wheels so that the automobile is decelerated from entering into the instability and/or is applied with a turning moment generated in the automobile around the braked wheel or wheels to counteract the movement of the automobile toward the instability.

SUMMARY OF THE INVENTION

Apart from such a stability control of automobiles based upon a parameter indicative of a liability to instability, the present inventors have noted that if the brake force or the traction force acting at each of the front right, front left, rear right and rear left wheels of an automobile are controlled to make the ratio of either a longitudinal or lateral tire grip force to a vertical load at each of the wheels be equal to one another, the automobile can maintain a high running stability of behavior even when the tire grip of the wheels against the road surface saturates so that the wheels slip over the surface of the road.

Therefore, it is a primary object of the present invention to provide a running stability control device of an automobile based upon the above-mentioned principle of maintaining a high stability of behavior.

According to the basic concept of the present invention, in an automobile having front right, front left, rear right and rear left wheels, and a brake system for selectively braking each of said wheels separately, the running stability control device comprises a means for estimating a ratio of a longitudinal force to a vertical load acting at each of the front right, front left, rear right and rear left wheels, and a means for operating said brake system so as to make said ratio of each of the front right, front left, rear right and rear left wheels be substantially equal to one another.

In the above-mentioned control device, the brake system may include a wheel cylinder for each of the front right, front left, rear right and rear left wheels, and said estimation means may includes a means for detecting pressure of a working fluid in each of the wheel cylinders, thereby estimating said ratios based upon the working fluid pressures in the wheel cylinders.

Further, said estimation means may further include a means for detecting rotation speed of the engine, a means for detecting throttle opening of the throttle valve, and a means for estimating traction by the engine applied to each of the front right, front left, rear right and rear left wheels based upon the engine rotation speed and the throttle opening, thereby estimating said ratios with incorporation of the traction estimated by the traction estimation means.

Further, said estimation means may further includes a means for detecting wheel speed of each of the front right, front left, rear right and rear left wheels, and a means for detecting road speed of the automobile, thereby estimating said ratios based upon the wheel speeds and the road speed.

Further, said estimation means may further include a means for detecting road conditions including at least a discrimination among dry, wet and icy/snowy conditions, thereby estimating said ratios with incorporation of the road conditions.

Further, said estimation means may further include a means for detecting wheel speed of each of the front right, front left, rear right and rear left wheels, thereby estimating said ratios through ratios of wheel speed between each two laterally, longitudinally and diagonally adjacent ones of the front right, front left, rear right and rear left wheels.

In the estimation of said ratios by said estimation means, as it is desirable that a longitudinal acceleration and/or a lateral acceleration acting at the automobile is detected by a longitudinal and/or lateral acceleration detection means and the effective radius of a corresponding wheel or wheels is modified according to the longitudinal and/or lateral acceleration in the estimation of said ratios.

Further, said estimation means may include a means for detecting opening of the throttle valve, a means for detecting a depression of the brake pedal, and a means for detecting a lateral acceleration acting at the automobile, said brake system operation means operating the brake system only when the lateral acceleration is greater than a first threshold value on a condition that said brake pedal depression detection means is detecting the depression of the brake pedal, said brake system operation means operating the brake system only when the lateral acceleration is greater than a second threshold value on a condition that said brake pedal depression detection means is not detecting the depression of the brake pedal but said throttle opening detection means is detecting a throttle opening of the engine greater than a threshold value indicative of a substantial output of the engine, said brake system operation means operating the brake system only when the lateral acceleration is greater than a third threshold value on a condition that said brake pedal depression detection means is not detecting the depression of the brake pedal and said throttle opening detection means is not detecting a throttle opening greater than said threshold value therefor, said first threshold value being lower than said second threshold value, while said second threshold value being lower than said third threshold value.

The principle of the present invention will be described with reference to FIGS. 14 and 15.

FIG. 14 shows the so-called friction circle having a radius which indicates the ratio of an overall tire grip force available in all directions around a center point 0 of the contact area between a tire of a wheel of an automobile and a road surface to a vertical load applied to the tire. As well known in the art, the friction circle is not always a geometrically genuine circle but is deformed therefrom according to the tire face conditions and the road surface conditions, because the tire face and the road surface generally present or can be designed to present separate frictional resistances against a longitudinal slip and a lateral slip relative to the road surface so that the friction circle is generally deformed into an elliptical shape. However, for the sake of convenience, the friction circle is shown as a geometrically genuine circle in FIG. 14.

As will be apparent from the definition of the friction circle, any radius representing the ratio of overall tire grip force to vertical load in an optional orientation is disassembled into a corresponding ratio of a longitudinal tire grip force to the vertical load and a corresponding ratio of a lateral tire grip force to the vertical load according to the rule of the vector addition or subtraction. When the ratio of the longitudinal or lateral tire grip force to the vertical load is discussed within the friction circle, or in other words, below the saturation of the tire grip force, the ratio is equivalent to the so-called friction coefficient generally denoted by $\mu$. Denoting the ratio of the overall tire grip force to the vertical load, the ratio of the corresponding lateral tire grip force to the vertical load and the ratio of the corresponding longitudinal tire grip force to the vertical load by $\mu$, $\mu x$ and $\mu y$, respectively, $\mu^2 = \mu x^2 + \mu y^2$ FIG. 15 diagrammatically shows an automobile 100 having a front right wheel 102FR, a front left wheel 102FL, a rear right wheel 102RR and a rear left wheel 102RL, arranged with a tread Tr and distances between the center of gravity 104 of the automobile and the axes of the front and rear wheels denoted Lf and Lr, respectively.

Denoting the above-mentioned ratio of lateral tire grip force to vertical load and the ratio of longitudinal tire grip force to vertical load at the front right, front left, rear right and rear left wheels by $\mu x1$, $\mu x2$, $\mu x3$ and $\mu x4$ and $\mu y1$, $\mu y2$, $\mu y3$ and $\mu y4$, respectively, when the automobile 100 is subjected to a lateral acceleration Gx and a longitudinal acceleration Gy, both resultantly acting at the center of gravity 104 of a mass m of the automobile positioned at a height H above the road surface, the vertical load at each of the front right, front left, rear right and rear left wheels are, when denoted W1, W2, W3 and W4, respectively, available by the following equations, wherein W is the total static weight of the automobile, i.e. the product of the mass m and the acceleration of gravity:

$$W1 = \frac{W}{2} \cdot \frac{Lr}{Lf+Lr} + \frac{Gx \cdot m \cdot H}{Tr} \cdot \frac{Lr}{Lf+Lr} + \frac{1}{2} \cdot \frac{Gy \cdot m \cdot H}{Lf+Lr} \quad (1)$$

$$W2 = \frac{W}{2} \cdot \frac{Lr}{Lf+Lr} - \frac{Gx \cdot m \cdot H}{Tr} \cdot \frac{Lr}{Lf+Lr} + \frac{1}{2} \cdot \frac{Gy \cdot m \cdot H}{Lf+Lr} \quad (2)$$

$$W3 = \frac{W}{2} \cdot \frac{Lf}{Lf+Lr} + \frac{Gx \cdot m \cdot H}{Tr} \cdot \frac{Lf}{Lf+Lr} - \frac{1}{2} \cdot \frac{Gy \cdot m \cdot H}{Lf+Lr} \quad (3)$$

$$W4 = \frac{W}{2} \cdot \frac{Lf}{Lf+Lr} - \frac{Gx \cdot m \cdot H}{Tr} \cdot \frac{Lf}{Lf+Lr} - \frac{1}{2} \cdot \frac{Gy \cdot m \cdot H}{Lf+Lr} \quad (4)$$

A yaw moment, when denoted M, applied to the automobile resultantly around the center of gravity 104 of the automobile from the road surface is estimated by the following equation:

$$M = W1 \cdot \mu x1 \cdot Lf + W2 \cdot \mu x2 \cdot Lf - W3 \cdot \mu x3 \cdot Lr - \quad (5)$$
$$W4 \cdot \mu x4 \cdot Lr + W2 \cdot \mu y2 \cdot \frac{Tr}{2} + W4 \cdot \mu y4 \cdot \frac{Tr}{2} -$$
$$W1 \cdot \mu y1 \cdot \frac{Tr}{2} - W3 \cdot \mu y3 \cdot \frac{Tr}{2}$$

Now, if it is assumed that $\mu x1, \mu x2, \mu x3$ and $\mu x4$ are equal to one another, as can be denoted by $\mu x$, together with an assumption that the friction circles of the front right, front left, rear right and rear left wheels are the same as one another, and the tire grip is in saturation so that the above-mentioned equation $\mu^2 = \mu x^2 + \mu y^2$ is established, then $\mu y1$, $\mu y2$, $\mu y3$ and $\mu y4$ are also equal to one another, as can be denoted by $\mu y$, equation 5 will be rewritten as follows:

$$M = (W1+W2) \cdot \mu x \cdot Lf - (W3+W4) \cdot \mu x \cdot Lr + \quad (6)$$
$$(W2+W4) \cdot \mu y \cdot \frac{Tr}{2} - (W1+W3) \cdot \mu y \cdot \frac{Tr}{2}$$

Therefore, by substituting W1, W2, W3 and W4 of equations 1–4 for those of equation 6, M is expressed as follows:

$$M = \left(\frac{W \cdot Lr + Gy \cdot m \cdot H}{Lf+Lr}\right) Lf \cdot \mu x - \quad (7)$$
$$\left(\frac{W \cdot Lf - Gy \cdot m \cdot H}{Lf+Lr}\right) Lr \cdot \mu x +$$
$$\left(\frac{W}{2} - \frac{Gx \cdot m \cdot H}{Tr}\right) \frac{Tr}{2} \cdot \mu y - \left(\frac{W}{2} + \frac{Gx \cdot m \cdot H}{Tr}\right) \frac{Tr}{2} \cdot \mu y$$
$$= Gy \cdot m \cdot H \cdot \mu x - Gx \cdot m \cdot H \cdot \mu y$$

According to the lateral and longitudinal balances of forces, the following relationships are obtained:

$$Gx \cdot m = (W1 \cdot \mu x1 + W2 \cdot \mu x2 + W3 \cdot \mu x3 + W4 \cdot \mu y4) = W \cdot \mu y \quad (8)$$

$$Gy \cdot m = (W1 \cdot \mu y1 + W2 \cdot \mu y2 + W3 \cdot \mu y3 + W4 \cdot \mu y4) = W \cdot \mu x \quad (9)$$

By substituting Gx·m and Gy·m of equations 8 and 9 for those in equation 7, it is rewritten as follows:

$$M = W \mu y \cdot H \mu x - W \mu x \cdot H \mu y = 0 \quad (10)$$

Therefore, if the conditions $\mu x1 = \mu x2 = \mu x3 = \mu x4$ or $\mu y1 = \mu y2 = \mu y3 = \mu y4$ is satisfied under the condition that the tire grip is in saturation so that $\mu x1 = \mu x2 = \mu x3 = \mu x4$ is the case with $\mu y1 = \mu y2 = \mu y3 = \mu y4$, the automobile can run with no yaw moment being applied thereto even when the tire grip of the four wheels has saturated so that the automobile is otherwise liable to running behavior instabilities such as spin or driftout.

BRIEF DESCRIPTION OF THE DRAWINGS

In the accompanying drawings.

DESCRIPTION OF THE EMBODIMENTS

The present invention will be described in more detail with respect to several embodiments thereof with reference to the accompanying drawings.

Figure 1:
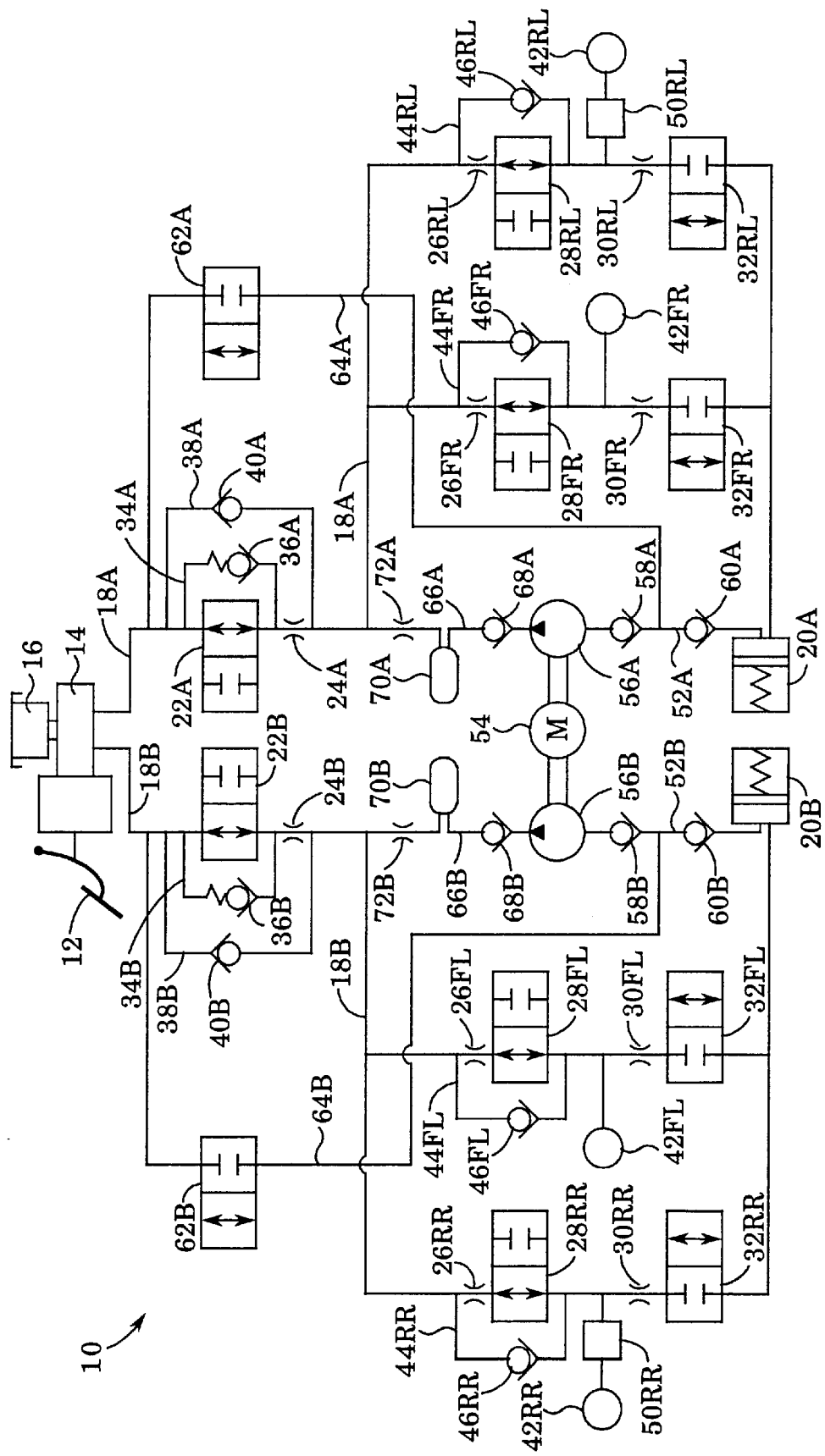
FIG. 1 is a diagrammatical view showing an embodiment of a working fluid hydraulic circuit of a brake system of an automobile with which the present invention is constructed.
Figure 15:
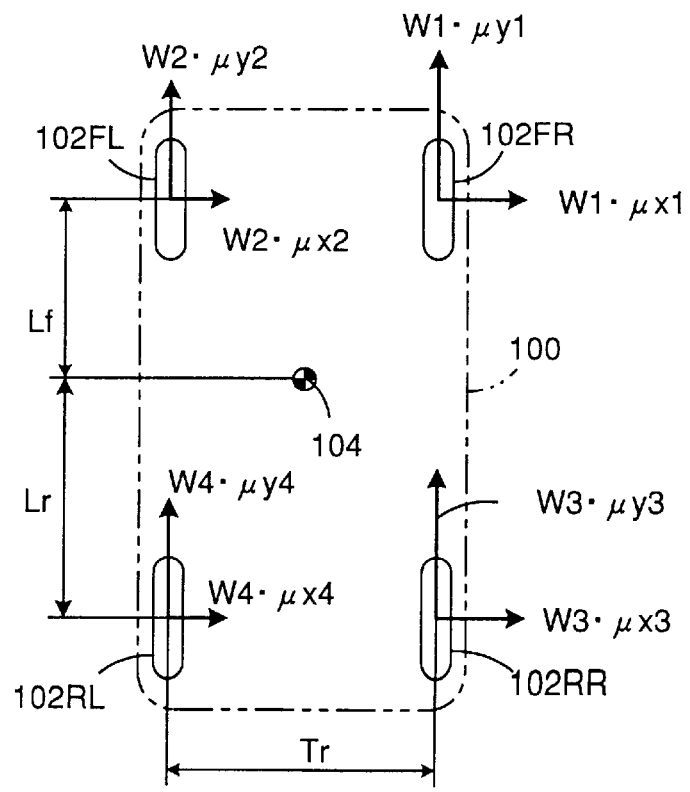
FIG. 15 is a diagram illustrating a basic construction of an automobile.

Referring to FIG. 1 showing an embodiment of a working fluid hydraulic circuit of a brake system of an automobile with which the running stability control device according to the present invention may be constructed, the working fluid hydraulic circuit generally designated by 10 includes a brake pedal 12 adapted to be depressed by a driver so as to actuate a master cylinder 14 adapted to take in a working fluid from a reservoir 16 and to deliver the working fluid as pressurized to a working fluid supply passage 18A for a front right wheel (not shown in FIG. 1 but corresponds to 102FR of FIG. 15, and similar for other wheels) having a wheel cylinder 42FR and a rear left wheel having a wheel cylinder 42RL, and to a working fluid supply passage 18B for a front left wheel having a wheel cylinder 42FL and a rear right wheel having a wheel cylinder 42RR. At an upstream part of the passage 18A common for the wheel cylinders 42FR and 42RL there is provided a changeover valve 22A normally in communication (open state) and adapted to be selectively changed over to block the passage (closed state). The changeover valve 22A is bypassed by a relief valve 36A for relieving a pressure from the downstream side to the upstream side of the changeover valve 22A as viewed from the side of the master cylinder 14. Further, a throttle means 24A is provided in the passage 18A in series with the changeover valve 22A at the downstream side thereof, and the series connection of the changeover valve 22A and the throttling means 24A is bypassed by a passage 38A including a check valve 40A which allows the working fluid to flow only from the master cylinder 14 toward the wheel cylinders 42FR and 42RL.

The working fluid supplied through the passage 18A is conducted to the wheel cylinders 42FR and 42RL through changeover valves 28FR and 28RL, respectively, and the working fluid supplied to the wheel cylinders 42FR and 42RL is exhausted through changeover valves 32FR and 32RL, respectively, toward a reservoir 20A. The changeover valves 28FR and 28RL are each normally in communication (open state) and are selectively changed over to block the passage (closed state). To the contrary, the changeover valves 32FR and 32RL are each normally blocked (closed state) and are selectively changed over to communicate (open state). In series with the changeover valves 28FR and 28RL there are provided throttling means 26FR and 26RL, respectively, and the series connection of the throttling means 26FR or 26RL and the changeover valve 28FR or 28RL is each bypassed by a passages 44FR or 44RL including a check valve 46FR or 46RL, respectively, the check valves each allowing the working fluid to flow only from the downstream side of the changeover valves 28FR and 28RL to the upstream side of the throttling means 26FR and 26RL, respectively. Throttling means 30FR and 30RL are provided in series with the changeover valves 32FR and 32RL at the upstream side thereof, respectively.

A pump 56A is provided to take in the working fluid from the reservoir 20A through a suction passage 52A including a series connection of check valves 60A and 58A and to deliver the working fluid by charging a pump head thereto through a delivery passage 66A including a check valve 68A toward the passage 18A when driven by a motor 54. An accumulator 70A is connected to the passage 66A at the downstream side of the check valve 68A, and a throttling means 72A is incorporated in the passage 66A at the downstream side of the accumulator 70A along the flow of the working fluid delivered by the pump 56A.

A passage 64A is branched from the passage 18A at an upstream point of the changeover valve 22A to be connected to the suction passage 52A of the pump 56A at a point between the check valves 60A and 58A, the passage 64A including a changeover valve 62A which is normally blocked (closed state) and selectively changed over to communicate (open state).

A similar working fluid hydraulic circuit is provided as connected to the passage 18B for a front left wheel having a wheel cylinder 42FL and a rear right wheel having a wheel cylinder 42RR. In FIG. 1, the portions of the circuit for the wheel cylinders 42FL and 42RR corresponding to those of the circuit for the wheel cylinders 42FR and 42RL are designated by the same reference numerals with addition of B in contrast to A and FL or RR in contrast to FR or RL, respectively, and repetitive descriptions thereabout will be avoided for the brevity of the specification.

In the working fluid hydraulic brake system shown in FIG. 1, when no stability control by the running stability control device according to the present invention is executed, the changeover valves are all in the shown state. Therefore, when the brake pedal 12 is depressed by the driver, the wheel cylinders 42FR, 42RL, 42FL and 42RR are supplied with a same working fluid pressure according to the degree of depression of the brake pedal 12 by the driver so that the same corresponding braking is applied uniformly to the four wheels.

When the running stability control device is actuated, the changeover valve 22A, 22B and 62A, 62B are changed over to the closed state and the open state, respectively, and the pumps 56A and 56B are started so that a pressurized working fluid source is available in the passages 18A and 18B to be prepared for any of the wheel cylinders 42FR, 42RL, 42FL and 42RR being supplied with a controlled pressure according to the balance between the duration of a first state that the changeover valves 28FR, 28RL, 28FL and 28RR are opened while the changeover valve 32FR, 32RL, 32FL and 32RR are closed, and the duration of a second state that the changeover valves 28FR, 28RL, 28FL and 28RR are closed while the changeover valves 32FR, 32RL, 32FL and 32RR are opened. The ratio of the duration of the first state to the duration of the second state is generally called a duty ratio for the control of such a set of normally open changeover valve and a normally closed changeover valve, and is controlled by an electric control means including a microcomputer. During the operating condition where the changeover valves 22A and 22B are closed, when the driver depresses the brake pedal 12, the driver's will for braking the automobile is transmitted through the changeover valves 62A and 62B in the open state to the wheel cylinders through the passages extending through the pumps 56A and 56B as an additional rise of the pump head delivered to the passages 18A and 18B, respectively.

Figure 2:
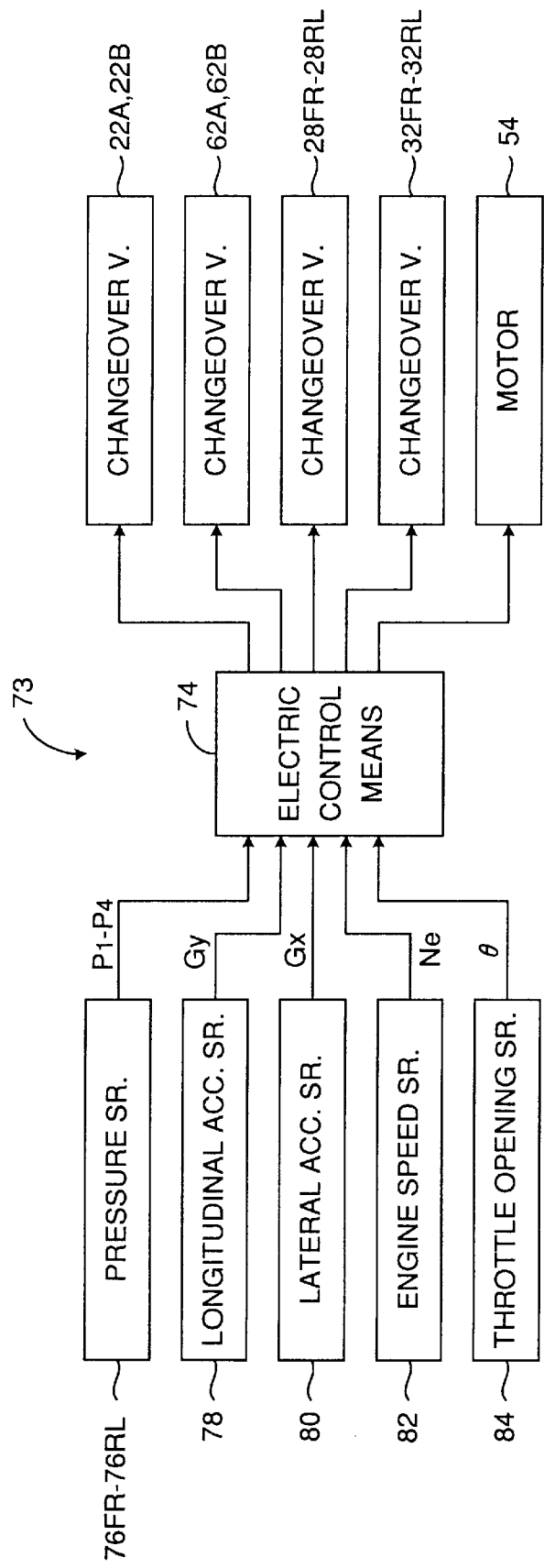
FIG. 2 is a diagrammatical view of a first embodiment of the running stability control device according to the present invention.

FIG. 2 shows diagrammatically a first embodiment of the running stability control device according to the present invention. In FIG. 2, the running stability control device generally designated by 73 comprises an electric control means 74 incorporating a microcomputer therein, various sensors for supplying information about the running conditions of the automobile as described in detail hereinunder, and actuator means such changeover valves 22A, 22B; 62A, 62B; 28FR–28RL; and 32FR–32RL and motor 54 shown in FIG. 1.

The sensors include pressure sensors 76FR, 76FL, 76RR and 76RL for detecting working fluid pressures P1, P2, P3 and P4 in the wheel cylinders 42FR, 42FL, 42RR and 42RL, respectively, a longitudinal acceleration sensor 78 for detecting longitudinal acceleration Gy acting at the automobile, a lateral acceleration sensor 80 for detecting lateral acceleration Gx acting at the automobile, an engine speed sensor 82 for detecting engine rotation speed Ne, and a throttle opening sensor 84 for detecting opening θ of the throttle valve of the engine (both not shown).

The operation of the control device 73 will be described with reference to the flowchart shown in FIG. 3.

When the engine ignition switch (not shown) is turned on, the control according to the flowchart is started to be repetitively executed at a cycle time such as tens of microseconds until the ignition switch is turned off. In step 10, signals such as shown in FIG. 2 are read in from those sensors shown in FIG. 2.

In step 20, vertical loads W1, W2, W3 and W4 at the front right, front left, rear right and rear left wheels are calculated according to the above-mentioned equations 1–4.

In step 30, braking forces Fb1, Fb2, Fb3 and Fb4 acting at the front right, front left, rear light and rear left wheels are calculated according to the below-mentioned equation 11, wherein Pwi (i=1–4) are the working fluid pressures of the wheel cylinders of the front right, front left, rear right and rear left wheels, respectively, Awc is a pressure receiving area (not shown) of the brake, Bef is an effectiveness factor of the brake pad (not shown), Rr is an effective radius of a brake rotor (not shown) and Rt is an effective radius of the tire of the four wheels, provided that Awc, Bef, Rr and Rt are each common for the four wheels for the sake of convenience:

$$Fbi = Pwi \cdot Awc \cdot Bef \cdot Rr/Rt \; (i=1, 2, 3, 4) \tag{11}$$

In the first pass through step 30 after each start of the control, the values of Pwi are set to an appropriate initial standard value. Further, in the following, i=1, 2, 3, 4 is equivalent to i=fr, fl, rr, rl, representing front right, front left, rear right and rear left wheels.

Figure 4:
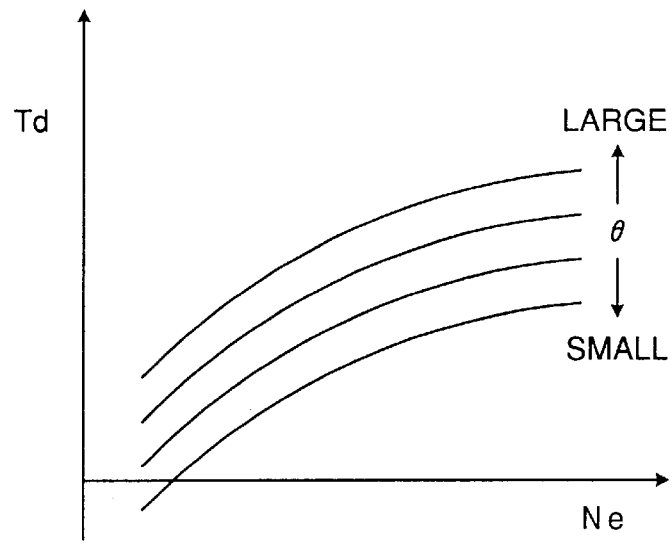
FIG. 4 is a map referred to in the control operation shown in FIG. 3.

In step 40, referring to a map such as shown in FIG. 4 with the current values of engine speed Ne and throttle opening θ detected by the respective sensors, the chive torque Td of the engine (not shown) is estimated.

In step 50, traction forces Fdi (i=1, 2, 3, 4) at the front right, front left, rear right and rear left wheels are calculated as follows, wherein Kdi (i=1, 2, 3, 4) are distribution factors of the drive torque of the engine to the corresponding wheels:

$$Fdi = Kdi \cdot Td \; (i=1, 2, 3, 4) \tag{12}$$

In step 60, longitudinal forces Fyi (i=1, 2, 3, 4) are calculated as follows:

$$Fyi = Fbi - Fdi \; (i=1, 2, 3, 4) \tag{13}$$

As will be noted in equation 13, the longitudinal force at each wheel is made positive when it is oriented rearward of the automobile, i.e. when the brake force is greater than the traction force.

In step 70, ratios, denoted $\mu yi$, of the longitudinal forces Fyi to the vertical forces Wi are calculated with respect to each of the four wheels as follows:

$$\mu yi = Fyi/Wi \; (i=1, 2, 3, 4) \tag{14}$$

Figure 5:
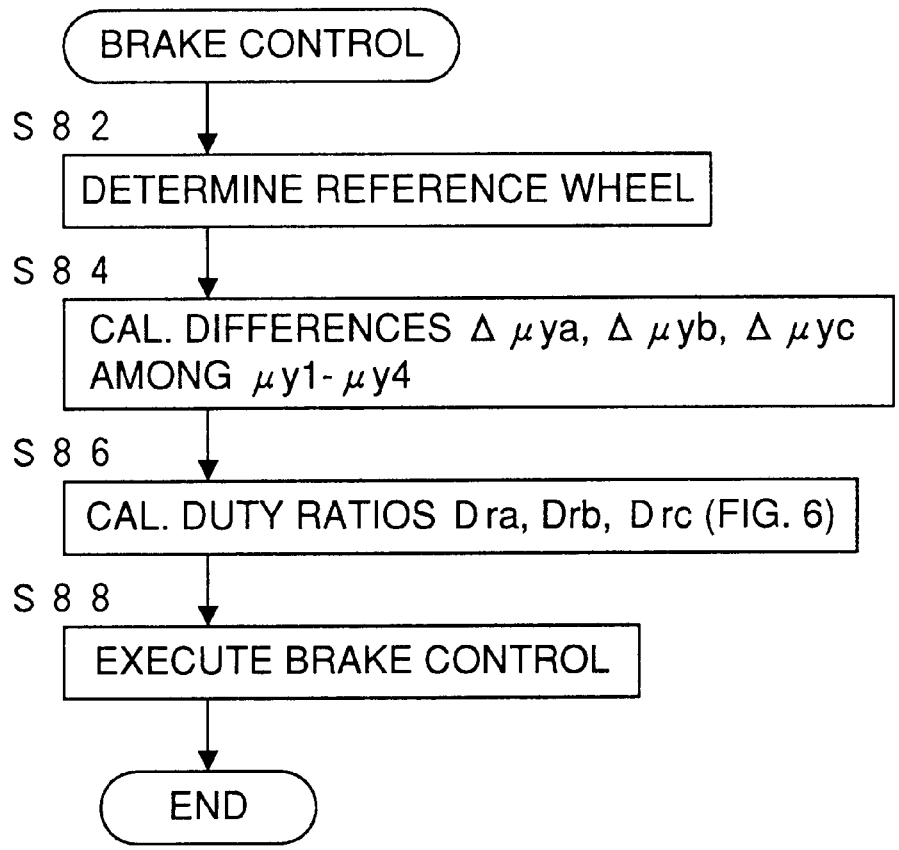
FIG. 5 is a flowchart showing a subroutine incorporated in the flowchart of FIG. 3.

In step 80, control signals are dispatched from the electric control means 74 to the changeover valves 22A, 22B; 62A, 62B; 28FR–28RL; and 32FR–32FL and the motor 54, so as to operate the working fluid hydraulic system shown in FIG. 1, such that the ratios $\mu y1$–$\mu y1$ be made equal to one another according to a process such as shown by a flowchart of FIG. 5.

Referring to FIG. 5, in step 82, a reference wheel is determined to be, for example, one of the four wheels at which $\mu yi$ is the largest of all.

Then in step 84, differences $\Delta \mu ya$, $\Delta \mu yb$ and $\Delta \mu yc$ among it $\mu y1$–$\mu y4$ relative to the largest thereof are calculated.

Figure 6:
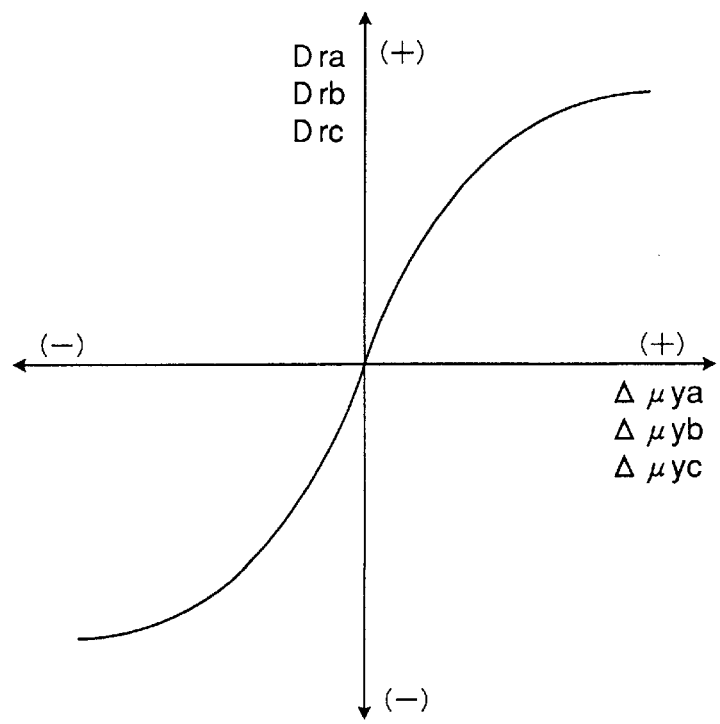
FIG. 6 is a map referred to in the operation of the control device of FIG. 2 and other subsequent embodiments of the control device according to the present invention.

In step 86, by referring to a map such as shown in FIG. 6, duty ratios Dra, Drb and Drc are calculated based upon the differences $\Delta \mu ya$, $\Delta \mu yb$ and $\Delta \mu yc$, respectively.

In step 88, corresponding changeover valves 22A, 22B; 62A, 62B; 28FR–28RL; and 32FR–32RL are operated so as to increase the ratios $\mu y1$–$\mu y4$ of the wheels showing the differences $\Delta \mu ya$, $\Delta \mu yb$ and $\Delta \mu yc$, respectively, until the differences $\Delta \mu ya$–$\Delta \mu yc$ are converged to zero. During the progress of the control, i.e. the repetitions of the scanning through the flowchart of FIG. 3, the reference wheel may change with corresponding changes of $\Delta \mu ya$, $\Delta \mu yb$ and $\Delta \mu yc$ so that the wheel showing the ratio $\mu y1$, $\mu y2$, $\mu y3$ or $\mu y4$ which is the highest is made the reference wheel at each instant.

Figure 7:
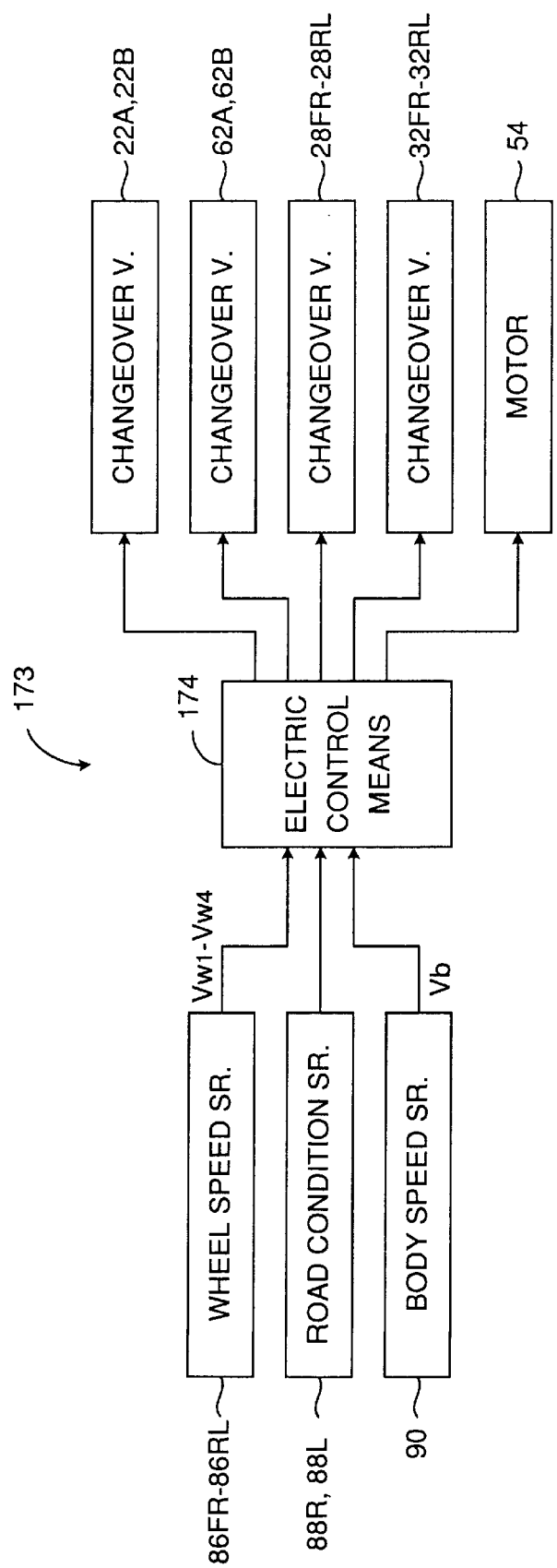
FIG. 7 is a diagrammatical view of a second embodiment of the running stability control device according to the present invention.

FIG. 7 is a view similar to FIG. 2, showing a second embodiment of the running stability control device according to the present invention. In FIG. 7, the portions corresponding to those shown in FIG. 2 are designated by the same reference numerals as in FIG. 2.

In this second embodiment, the control device generally designated by 173 comprises an electric control means 174 similar to the electric control means 74 of FIG. 2, and wheel speed sensors 86FR, 86FL, 86RR and 86RL for detecting wheel speeds Vw1, Vw2, Vw3 and Vw4 of the front right, front left, rear right and rear left wheels, road condition sensors 88R and 88L for detecting road conditions such as a discrimination among dry, wet and icy/snowy conditions or irregularities of the road surface as specified for the right and left sides of the automobile, and a body speed sensor 90 (such as a laser speed detector) for detecting road speed Vb of the automobile body, as the means for inputting information about the running conditions of the automobile into the electric control means 174, to operate the working fluid hydraulic circuit shown in FIG. 1.

Figure 3:
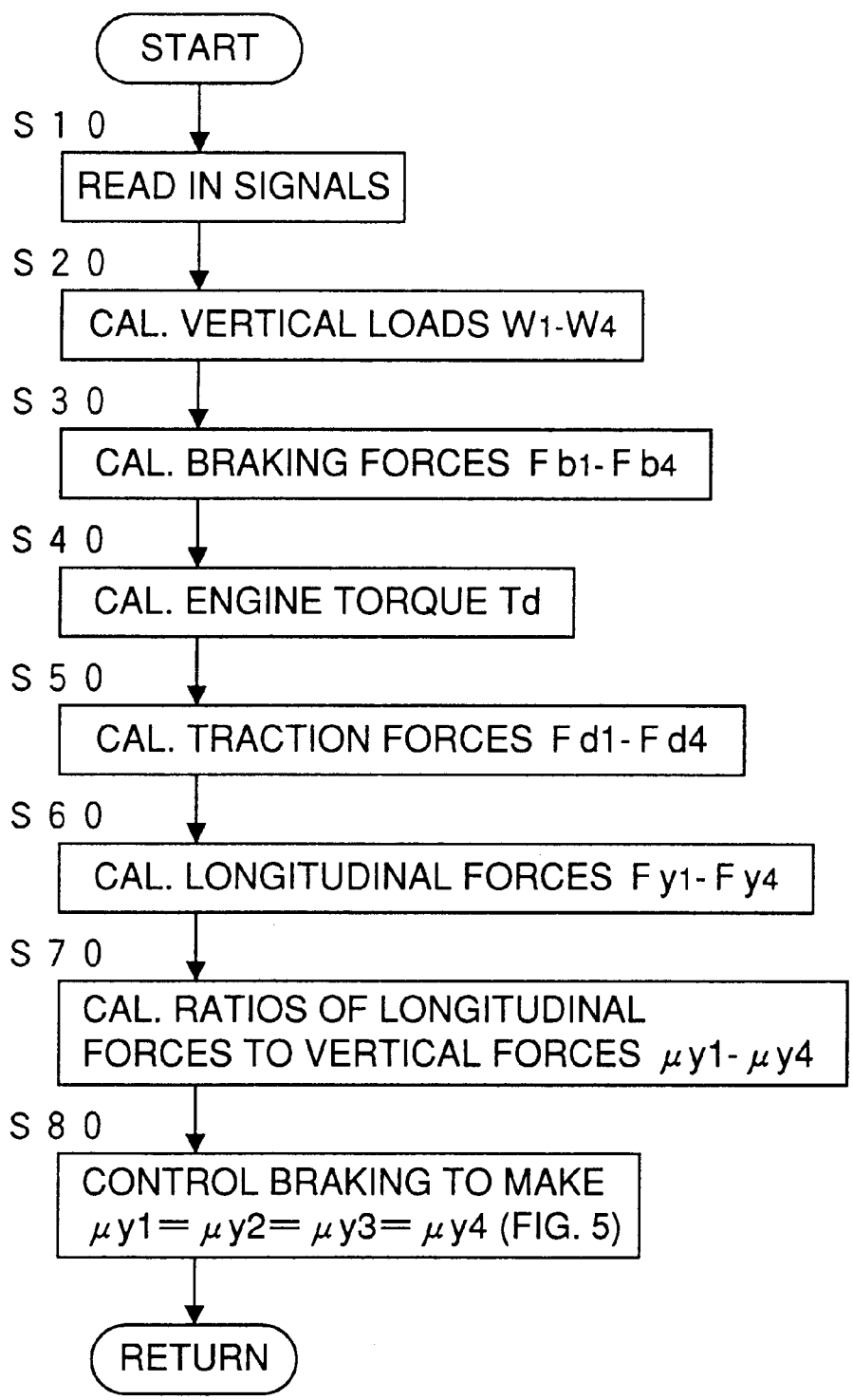
FIG. 3 is a flowchart showing the operation of the control device shown in FIG. 2.
Figure 8:
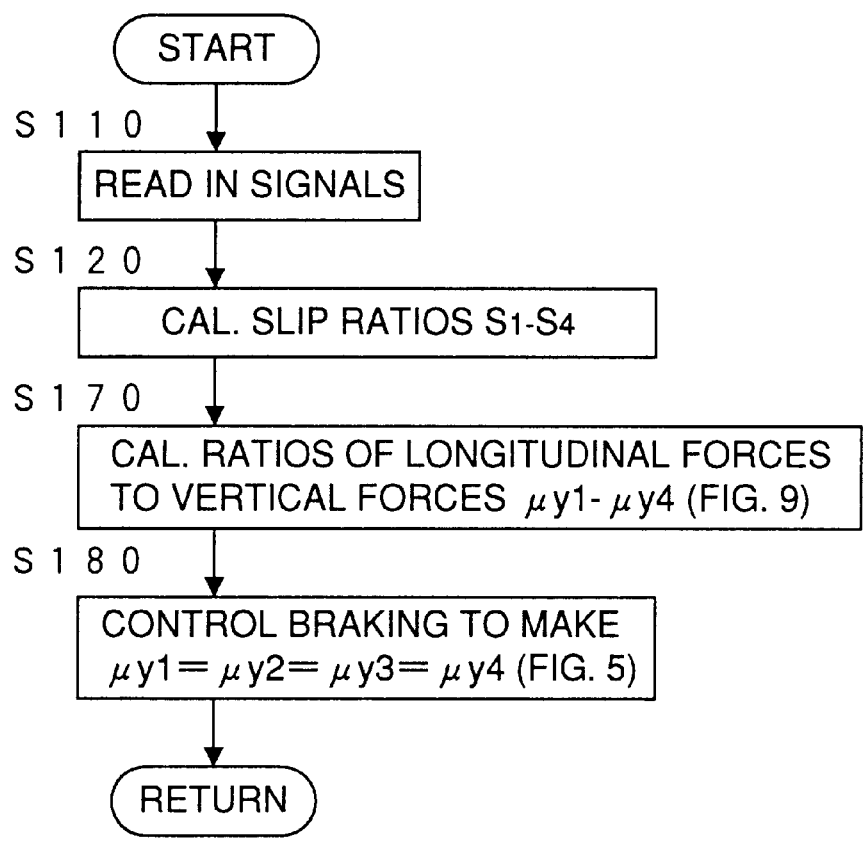
FIG. 8 is a flowchart showing the operation of the control device shown in FIG. 7.

FIG. 8 is a flowchart showing the operation of the running stability control device 173, similar to FIG. 3 showing the operation of the control device 73 of FIG. 2.

Similarly, when the control device is put on by turning on of the ignition switch (not shown), in step 110, signals are read in from those sensors shown in FIG. 7.

In step 120, slip ratios S1, S2, S3 and S4 of the front right, front left, rear right and rear left wheels relative to the road surface are calculated based upon the signals received from the wheel speed sensors 86FR–86RL and the body speed sensor 90, as follows:

$$Si = |Vb - Vwi|/Vb \ (I=1, 2, 3, 4) \tag{15}$$

Figure 9:
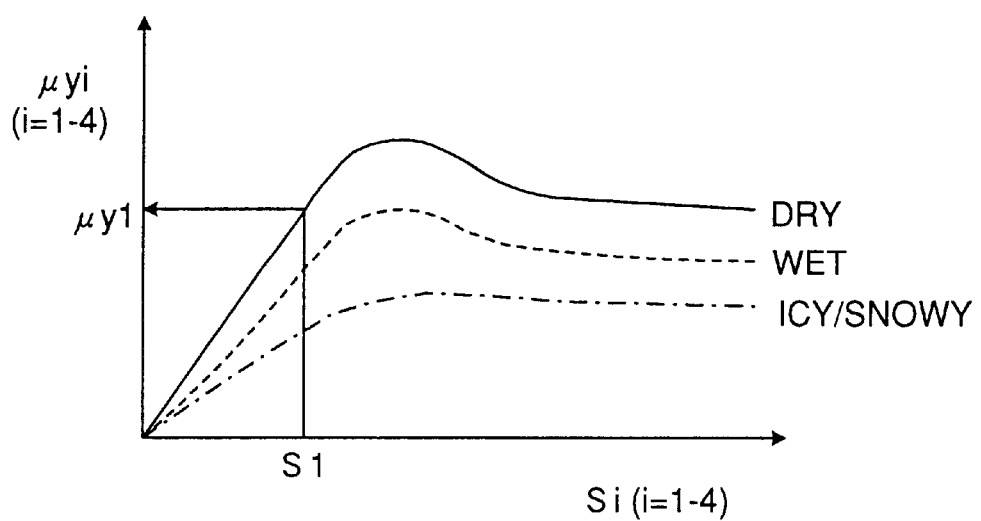
FIG. 9 is a map referred to in the control operation shown in FIG. 8.

In step 170, by referring to a map such as shown in FIG. 9, ratios $\mu yi$ (i=1, 2, 3, 4) corresponding to those calculated based upon the longitudinal tire grip forces Fyi and the vertical loads Wi (i=1, 2, 3, 4) in the above-mentioned first embodiment are directly estimated based upon the slip ratios Si (i=1, 2, 3, 4) and the signals received from the road condition sensors 88R and 88L. It is considered to be possible to estimate the above-mentioned ratio at each wheel based upon the slip ratio of the wheel relative to the road surface and the road surface condition within an acceptable allowance when the road surface condition is discriminated to be such as dry, wet or icy/snowy. Of course, more other details of the road surface conditions will be desired to estimate said ratios at higher precision. When the road surface conditions are detected separately by a pair of sensors such as 88R and 88L for the right and left sides of the automobile, the running stability control is more precisely adaptable to such road surface conditions where the right side and left side wheels are liable to different slips highly inductive of a spin or a driftout.

In step 180, in the same manner as in step 80, control signals are dispatched from the electric control means 174 to the changeover valves 22A, 22B; 62A, 62B; 28FR–28RL; and 32FR–32FL and the motor 54 so as to operate the working fluid hydraulic system shown in FIG. 1, such that the ratios $\mu y1 - \mu y4$ be made equal to one another according to a process such as shown by the flowchart of FIG. 5.

Figure 10:
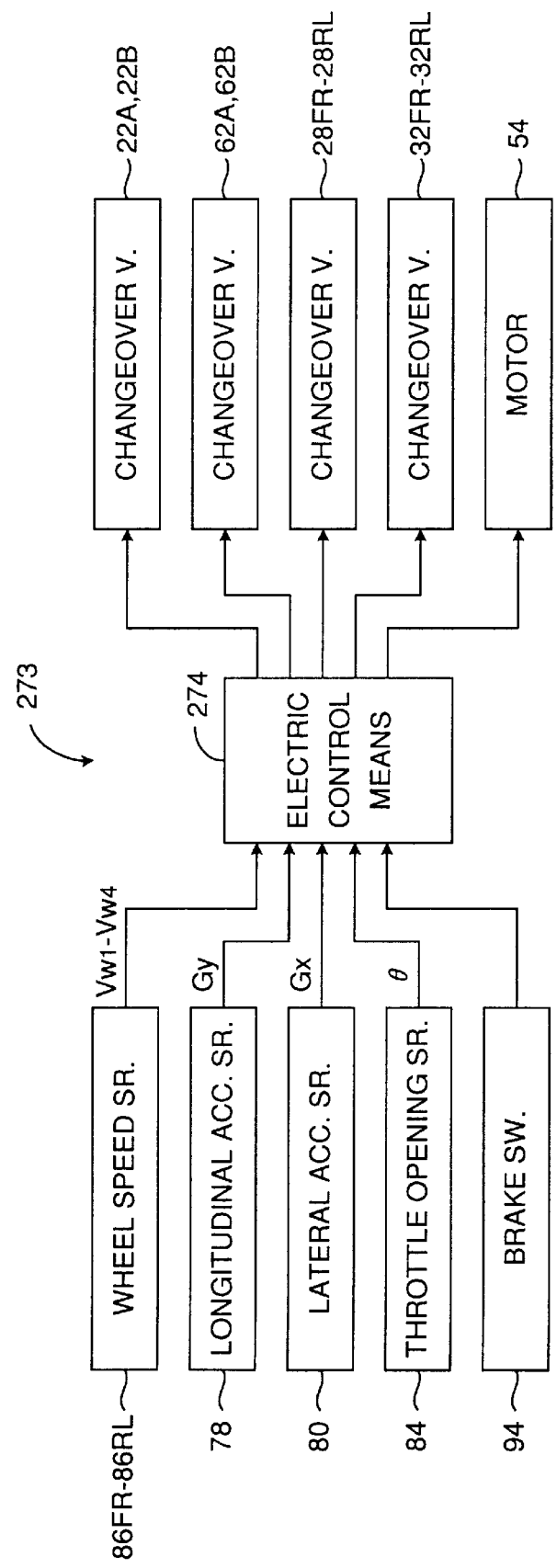
FIG. 10 is a diagrammatical view of a third embodiment of the running stability control device according to the present invention.

FIG. 10 is a view similar to FIGS. 2 and 7, showing a third embodiment of the running stability control device according to the present invention. In FIG. 10, the portions corresponding to those shown in FIGS. 2 or 7 are designated by the same reference numerals as those figures.

In this third embodiment, the control device generally designated by 273 comprises an electric control means 274 similar to the electric control means 74 of FIG. 2 or 174 of FIG. 7, and wheel speed sensors 86FR, 86FL, 86RR and 86RL for detecting wheel speeds Vw1, Vw2, Vw3 and Vw4 of the front right, front left, rear right and rear left wheels, a longitudinal acceleration sensor 78 for detecting longitudinal acceleration Gy acting at the automobile, a lateral acceleration sensor 80 for detecting lateral acceleration Gx acting at the automobile, a throttle opening sensor 84 for detecting throttle opening θ of the engine (not shown), and a brake switch 94 for indicating a substantial depression of the brake pedal by the driver, as the means for inputting information about the running conditions of the automobile into the electric control means 274, to operate the working fluid hydraulic circuit shown in FIG. 1.

Figure 11:
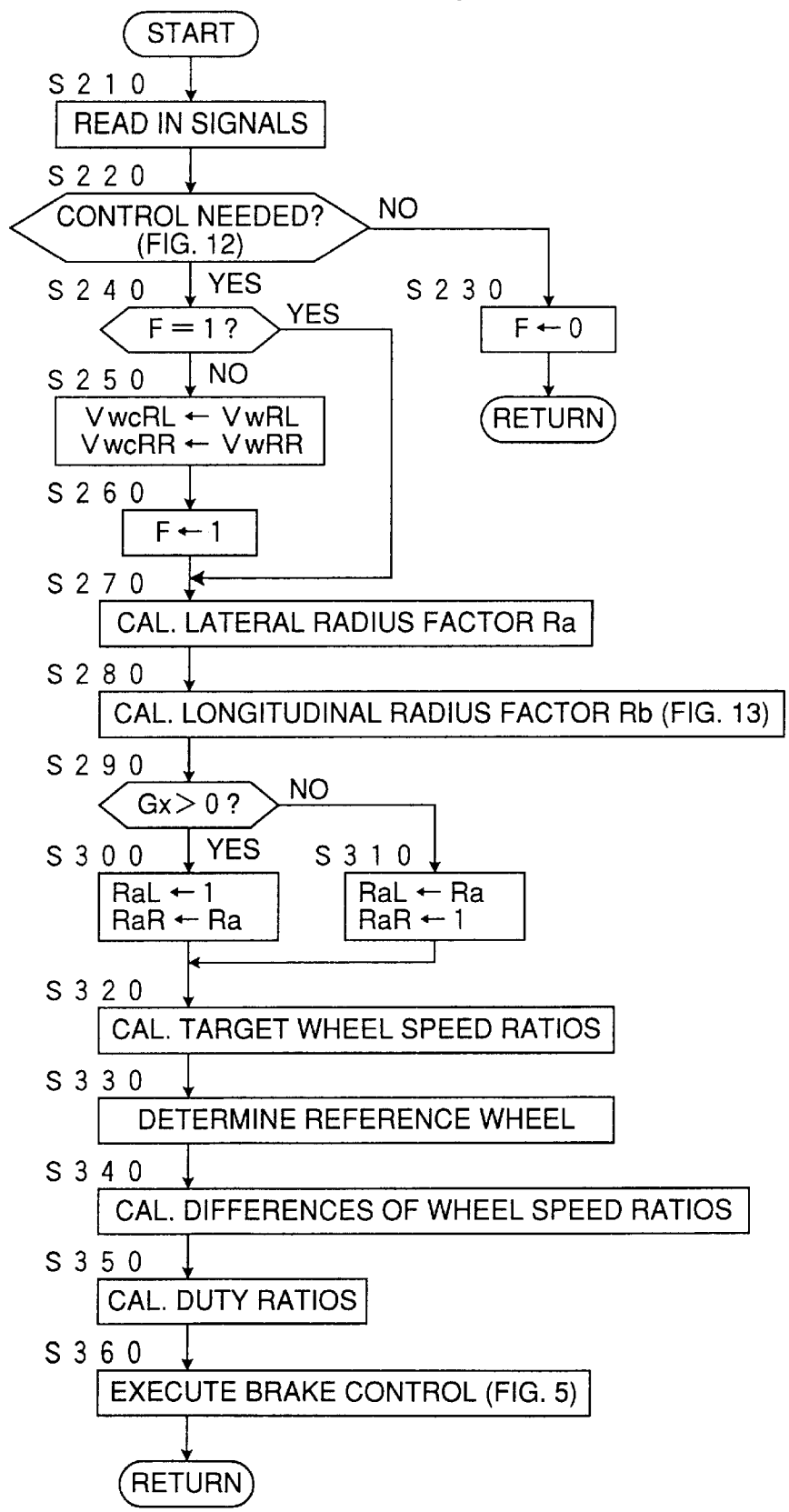
FIG. 11 is a flowchart showing the operation of the control device shown in FIG. 10.

FIG. 11 is a flowchart showing the operation of the running stability control device 273, similar to FIGS. 3 and 8.

Similarly, when the control device is put on by turning on of the ignition switch (not shown), in step 210, signals are read in from those sensors shown in FIG. 10.

Figure 12:
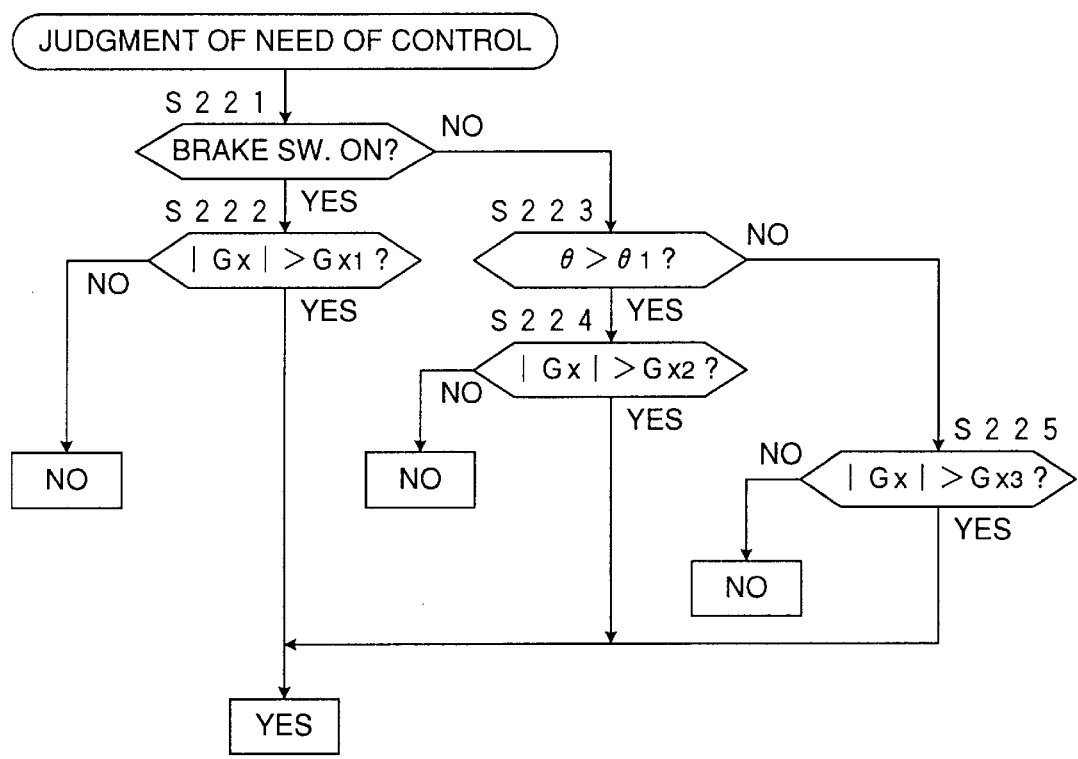
FIG. 12 is a flowchart showing a subroutine incorporated in the flowchart of FIG. 11.

In step 220, it is judged if the control by the present control device is needed. An embodiment of such a judgment operation is shown in FIG. 12 and described later. If the answer is yes, the control proceeds to step 240, whereas if the answer is no, the control proceeds to step 230, where a flag F for such an option is reset to zero, and a cycle of control is ended.

In step 240, it is judged if the flag F, which is always initialized to zero at each start of the control, is 1 or not. In the first pass of the control after each start of the control operation, the answer is no, and therefore, in the first pass, the control proceeds to step 250.

In step 250, wheel speeds of a pair of front wheels or a pair of rear wheels selected as reference wheels are referred to as right and left reference wheel speeds. In more detail, assuming that the present automobile is of a front drive type, considering that a pair of non-driven wheels are more suitable for the reference wheels, assuming that a pair of rear wheels are selected as the reference wheels, wheel speeds VwRR and VwRL of the rear right and rear left wheels are referred to as right and left reference wheel speeds VwcRR and VwcRL, respectively.

In step 260, the flag F is set to 1.

In step 270, a lateral radius factor denoted Ra is estimated to give the ratio of the radius of a wheel serving at the downstream side of the lateral acceleration Gx to that of a wheel serving at the upstream side of the lateral acceleration Gx, based upon the absolute value of Gx detected by the lateral acceleration sensor 80, by referring to an appropriate map not shown in the figure. The factor Ra is equal to or smaller than 1, and reflects thereon a reduction of the effective radius of the tire due to a greater compression by the force applied by the lateral acceleration Gx.

Figure 13:
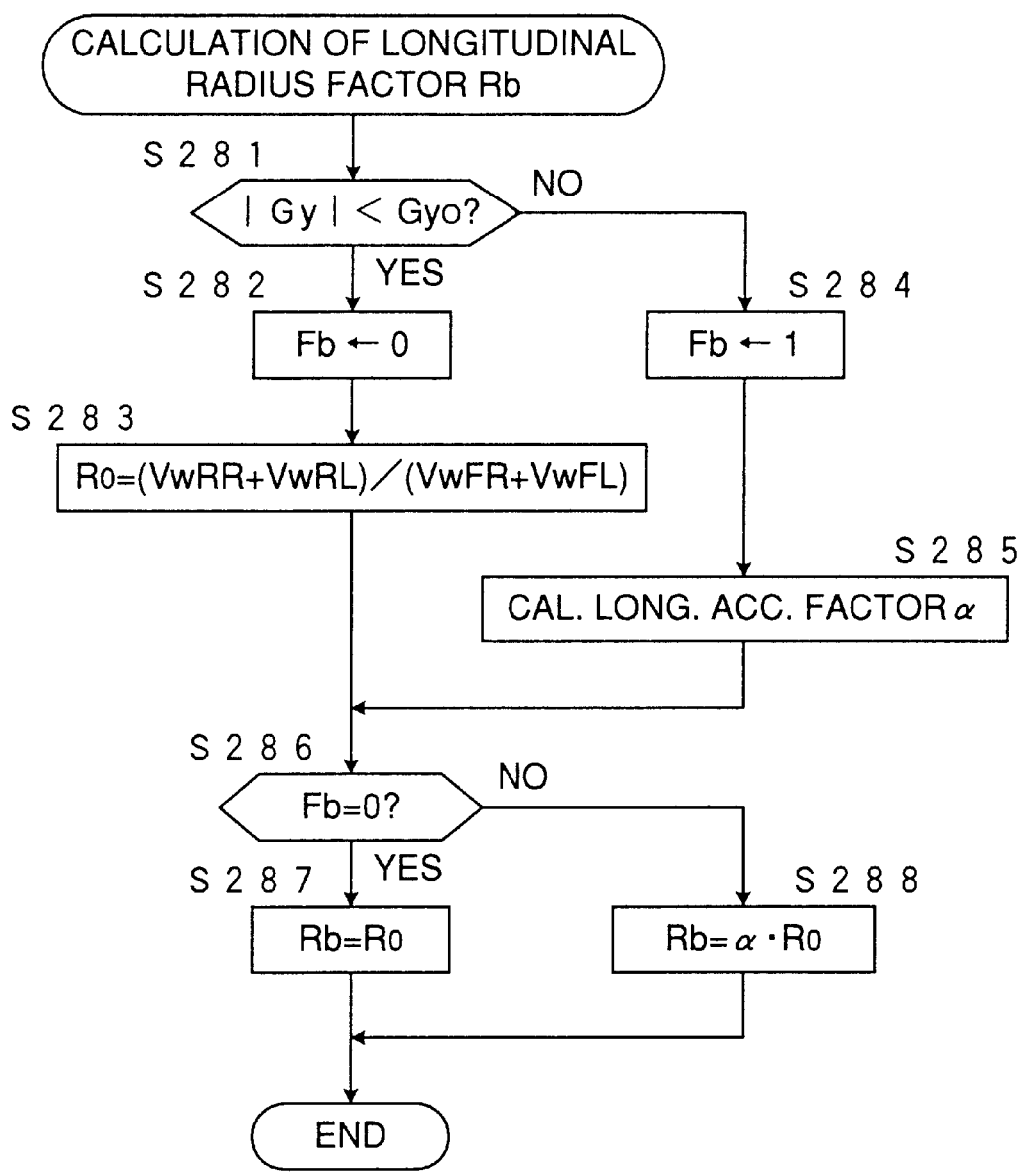
FIG. 13 is a flowchart showing a subroutine incorporated in the flowchart of FIG. 11.

In step 280, according to a subroutine such as shown in FIG. 13, a longitudinal radius factor denoted Rb is calculated. As will be noted from the subroutine of FIG. 13 described later, Rb is a ratio of the radius of the front wheels to that of the rear wheels, reflecting thereon a reduction of the radius of the front wheels relative to the rear wheels due to a braking of the automobile, or a reduction of the radius of the rear wheels relative to the front wheels due to a traction of the automobile by the engine. As will be noted from such a definition, Rb decreases along with increase of the braking, while it increases along with increase of the traction. However, the value of Rb also changes according to the loading condition of the automobile, as described in more detail later with reference to FIG. 13.

In step 290, it is judged if the lateral acceleration Gx is positive (including zero for the convenience of processing) or not. When the lateral acceleration Gx is oriented rightward, it is made positive, and vice versa. When the answer is yes, the control proceeds to step 300, whereas when the answer is no, the control proceeds to step 310.

In step 300, lateral radius factor RaL for the front left and rear left wheels is made 1, while lateral radius factor RaR for the front right and rear right wheel is made Ra.

In step 310, lateral radius factor RaL for the front left and rear left wheel is made Ra, while lateral radius factor RaR for the front right and rear right wheel is made 1.

In step 320, the relationship between the wheel speeds to be targeted for with respect to two wheels adjacent to one another in lateral, longitudinal or diagonal relationship is estimated as a ratio therebetween based upon the above estimations of parameters, the relationship being available in six ways as follows, wherein VwtFR, VwtFL, VwtRR and VwtRL are the wheel speeds to be targeted for in the respective wheels:

$$VwtFL/VwtFR=VwcRL\cdot Rb/(VwcRR\cdot Rb)=VwcRL/VwcRR$$

$$VwtFL/VwtRL=VwcRL\cdot Rb/VwcRL=Rb$$

$$VwtFL/VwtRR=VwcRL\cdot Rb/VwcRR$$

$$VwtFR/VwtRL=VwcRR\cdot Rb/VwcRL$$

$$VwtFR/VwtRR=VwcRR\cdot Rb/VwcRR=Rb$$

$$VwtRL/VwtRR=VwcRL/VwcRR$$

In step 330, a reference wheel is determined according to the following comparisons:

The front right wheel (FR) is made the reference wheel, when, $$VwFL/VwFR>VwtFL/VwtFR$$

$$VwRR/VwFR>VwtRR/VwtFR$$

$$VwRL/VwFR>VwtRL/VwtFR$$

The front left wheel (FL) is made the reference wheel, when, $$VwFR/VwFL>VwtFR/VwtFL$$

$$VwRL/VwFL>VwtRL/VwtFL$$

$$VwRR/VwFL>VwtRR/VwtFL$$

The rear right wheel (RR) is made the reference wheel, when, $$VwRL/VwRR>VwtRL/VwtRR$$

$$VwFR/VwRR>VwtFR/VwtRR$$

$$VwFL/VwRR>VwtFL/VwtRR$$

The rear left wheel (RL) is made the reference wheel, when, $$VwRR/VwRL>VwtRR/VwtRL$$

$$VwFL/VwRL>VwtFL/VwtRL$$

$$VwFR/VwRL>VwtFR/VwtRL$$

In step 340, according to which of the four wheels is the reference wheel, differences of wheel speeds of three other wheels relative to that of the reference wheel are calculated as follows:

When the front right (FR) wheel is the reference wheel, $$\Delta VwtFL=VwtFL\cdot VwFR/VwtFR-VwFL$$

$$\Delta VwtRR=VwtRR\cdot VwFR/VwtFR-VwRR$$

$$\Delta VwtRL=VwtRL\cdot VwFR/VwtFR-VwRL$$

When the front left wheel (FL) is the reference wheel, $$\Delta VwtFR=VwtFR\cdot VwFL/VwtFL-VwFR$$

$$\Delta VwtRL=VwtRL\cdot VwFL/VwtFL-VwRL$$

$$\Delta VwtRR=VwtRR\cdot VwFL/VwtFL-VwRR$$

When the rear right wheel (RR) is the reference wheel, $$\Delta VwtRL=VwtRL\cdot VwRR/VwtRR-VwRL$$

$$\Delta VwtFR=VwtFR\cdot VwRR/VwtRR-VwFR$$

$$\Delta VwtFL=VwtFL\cdot VwRR/VwtRR-VwFL$$

When the rear left wheel (RL) is the reference wheel, $$\Delta VwtRR=VwtRR\cdot VwRL/VwtRL-VwRR$$

$$\Delta VwtFL=VwtFL\cdot VwRL/VwtRL-VwFL$$

$$\Delta VwtFR=VwtFR\cdot VwRL/VwtRL-VwFR$$

In step 350, by referring to a map not shown but similar to that shown in FIG. 6, duty ratios for operating the changeover valves 22A, 22B; 62A, 62B; 28FR–28RL; and 32FR–32RL are obtained, so as to brake one or more of the front right, front left, rear right and rear left wheels according to the values of each three combinations selected from $\Delta VwtFR$, $\Delta VwtFL$, $\Delta VwtRR$ and $\Delta VwtRL$ until those values are all converged to zero.

When the braking forces applied to the four wheels are controlled such that the differences $\Delta VwtFR-\Delta VwtRL$ are converged to zero, the ratio of the actual wheel speed to the target wheel speed of each of the four wheels are all converged to that of the reference wheel which shows at each moment the largest of such four ratios. Since the difference in the radius between the right and left wheels due to the lateral acceleration and that between the front and rear wheels due to each temporal loading condition and a braking or a traction are reflected on in the estimation of $\Delta VwtFR-\Delta VwtRL$, when the brake system is operated to converge $\Delta VwtFR-\Delta VwtRL$ to zero, it is considered that the ratio of the longitudinal force or lateral force acting at each of the front right, front left, rear right and rear left wheels to the vertical load acting thereon is made substantially equal to one another.

FIG. 12 is a flowchart showing an embodiment of the process for judging the need of executing the running stability control of FIG. 11.

In step 221, it is judged if the brake switch 94 is on or not, i.e. the brake pedal is depressed by the driver or not. If the answer is yes, the control proceeds to step 222, whereas if the answer no, the control proceeds to step 223.

In step 222, it is judged if the absolute value of the lateral acceleration Gx is greater than a first threshold value Gx1. If the answer is yes, it is judged that the control is needed, whereas if the answer is no, it is judged that the control is not needed.

In step 223, it is judged if the throttle opening 0 is greater than a threshold value 0 1 indicating a lower limit for generating a substantial traction by the engine. If the answer is yes, the control proceeds to step 224, whereas if the answer is no, the control proceeds to step 225.

In step 224, it is judged if the absolute value of the lateral acceleration Gx is greater than a second threshold value Gx2. If the answer is yes, it is judged that the control is needed, whereas if the answer is no, it is judged that the control in not needed.

In step 225, it is judged if the absolute value of the lateral acceleration Gx is greater than a third threshold value Gx3. If the answer is yes, it is judged that the control is needed, whereas if the answer is no, it is judged that the control is not needed.

Figure 14:
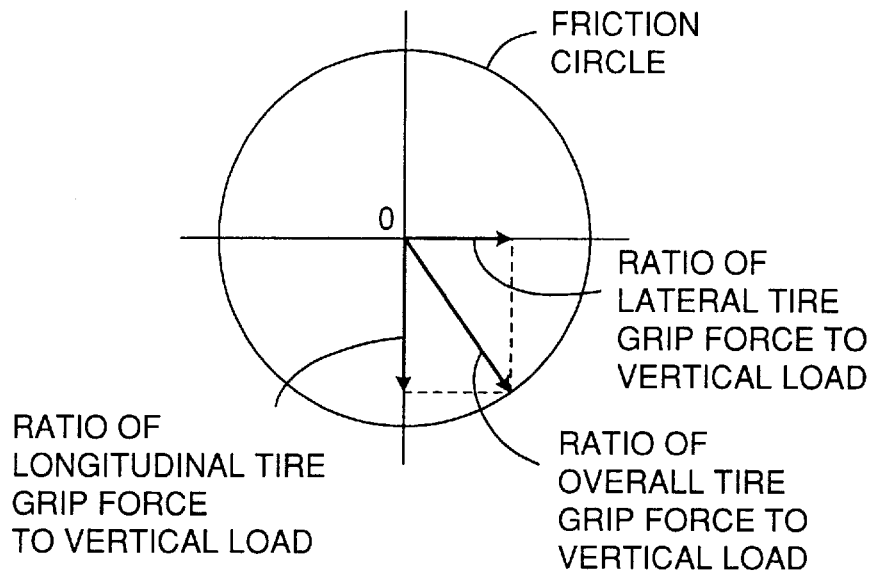
FIG. 14 is a diagram illustrating an example of the friction circle.

As will be noted from the friction circle shown in FIG. 14, the lateral tire grip limit essential for ensuring the running stability of the automobile is rapidly decreased by increase of the longitudinal acceleration. On the other hand, the running stability control based upon the braking should be suppressed to the minimum requirement. In view of the above and considering that the braking is generally more quickly increased than the traction, it is desirable that the threshold values are separately set up for steps 222, 224 and 225 such as G1<G2<G3.

It will be appreciated that the judgment of need of control according to FIG. 12 may also be incorporated in the first and second embodiments shown in FIGS. 2 and 7, respectively, although the second embodiment will need an addition of a lateral acceleration sensor and a throttle opening sensor to incorporate such a judgment system.

FIG. 13 is a flowchart showing the process of calculating the longitudinal radius factor Rb is step 280 of FIG. 11.

In step 281, it is judged if the absolute value of the longitudinal acceleration Gy is smaller than a low threshold value Gyo, and if the answer is yes, the control proceeds to step 282, where a flag Fb is set to zero, and the control further proceeds to step 283, whereas if the answer is no, the control proceeds to step 284, where the flag Fb is set to 1, and the control further proceeds to step 285.

In step 283, a static longitudinal radius factor Ro is calculated as a ratio of a mean value of the wheel speeds of the rear right and rear left wheels, i.e. (VwRR+VwRL)/2, to a mean value of the wheel speeds of the front right and front left wheels, i.e. (VwFR+VwFL)/2, during a running of the automobile with no substantial longitudinal acceleration being applied thereto. Herein it is assumed that the wheel speed sensors 86FR–86RL are so constructed as to detect VwFR–VwRL based upon the rotation speed of the respective wheels times a standard radius of the respective wheels. Therefore, when the effective radius of each of the front wheels decreases, the apparent values of VwFR and VwRL increase relative to those of VwRR and VWRL. R1 reflects thereon a temporal loading condition of the automobile.

In step 285, a longitudinal acceleration factor α is estimated based upon the longitudinal acceleration Gy which is generally due to a braking or a traction applied to the automobile, by referring to an appropriate map not shown in the figure. The factor α decreases along with increase of a braking, while it increases along with increase of a traction.

In step 286, it is judged if the flag Fb is zero or not, and if the answer is yes, the control proceeds to step 287, whereas if the answer is no, the control proceeds to step 288.

In step 287, the longitudinal radius factor Rb is made Ro, while in step 288, the longitudinal radius factor Rb is calculated as α·Ro.

Although the present invention has been described in detail with respect to some preferred embodiments thereof, it will be apparent for those skilled in the art that various modifications are possible with respect to the shown embodiments within the scope of the present invention.

What is claimed is:

1. A running stability control device of an automobile having front right, front left, rear right and rear left wheels, and a brake system for selectively braking each of said wheels separately, the control device comprising a means for estimating a ratio of a longitudinal force to a vertical load acting at each of the front right, front left, rear right and rear left wheels, and a means for operating said brake system so as to make said ratio of each of the front right, front left, rear right and rear left wheels be a maximum available as substantially equal to one another.

2. A running stability control device according to claim 1, wherein the brake system includes a wheel cylinder for each of the front right, front left, rear right and rear left wheels, and said estimation means includes a means for detecting pressure of a working fluid in each of the wheel cylinders, thereby estimating said ratios based upon the working fluid pressures in the wheel cylinders.

3. A running stability control device according to claim 2, wherein the automobile has an engine incorporating a throttle valve, and said estimation means includes a means for detecting rotation speed of the engine, a means for detecting throttle opening of the throttle valve, and a means for estimating traction by the engine applied to each of the front right, front left, rear right and rear left wheels based upon the engine rotation speed and the throttle opening, thereby estimating said ratios with incorporation of the traction estimated by the traction estimation means.

4. A running stability control device according to claim 1, wherein said estimation means includes a means for detecting wheel speed of each of the front right, front left, rear right and rear left wheels, and a means for detecting road speed of the automobile, thereby estimating said ratios based upon the wheel speeds and the road speed.

5. A running stability control device according to claim 4, wherein said estimation means further includes a means for detecting road conditions including at least a discrimination among dry, wet and icy/snowy conditions, thereby estimating said ratios with incorporation of the road conditions.

6. A running stability control device according to claim 1, wherein said estimation means includes a means for detecting wheel speed of each of the front right, front left, rear right and rear left wheels, thereby estimating said ratios through ratios of wheel speed between each two laterally, longitudinally and diagonally adjacent ones of the front right, front left, rear right and rear left wheels.

7. A running stability control device according to claim 1, wherein said estimation means further includes a means for detecting a longitudinal acceleration acting at the automobile, thereby incorporating an effect of the longitudinal acceleration in the estimation of said ratios as a corresponding change of effective radius of the wheels.

8. A running stability control device according to claim 1, wherein said estimation means further includes a means for detecting a lateral acceleration acting at the automobile, thereby incorporating an effect of the lateral acceleration in the estimation of said ratios as a corresponding change of effective radius of the wheels.

9. A running stability control device according to claim 1, wherein the automobile includes an engine having a throttle valve, said brake system includes a brake pedal, and said estimation means includes a means for detecting opening of the throttle valve, a means for detecting a depression of the brake pedal, and a means for detecting a lateral acceleration acting at the automobile, said brake system operation means operating the brake system only when the lateral acceleration is greater than a first threshold value on a condition that said brake pedal depression detection means is detecting the depression of the brake pedal, said brake system operation means operating the brake system only when the lateral acceleration is greater than a second threshold value on a condition that said brake pedal depression detection means is not detecting the depression of the brake pedal but said throttle opening detection means is detecting a throttle opening greater than a threshold value indicative of a substantial output of the engine, said brake system operation means operating the brake system only when the lateral acceleration is greater than a third threshold value on a condition that said brake pedal depression detection means is not detecting the depression of the brake pedal and said throttle opening detection means is not detecting a throttle opening greater than said threshold value therefor, said first threshold value being lower than said second threshold value, while said second threshold value being lower than said third threshold value.

* * * * *

UNITED STATES PATENT AND TRADEMARK OFFICE
CERTIFICATE OF CORRECTION

PATENT NO. : 6,106,081
DATED : 22 August 2000
INVENTOR(S) : Hiroshi ISONO et al.

It is certified that error appears in the above-identified patent and that said Letters Patent is hereby corrected as shown below:

| Column | Line | |
|---|---|---|
| 1 | 37 | After "decelerated" insert --to prevent it--. |
| 2 | 15 | Change "includes" to --include--. |
| 2 | 35 | Change "means as" to --means,--. |
| 4 | 40 | Change "W4 · μy4) = W · μx" to --W4 · μx4) = W · μx--. |
| 4 | 42 | Change "=W · μx" to -- =W · μy --. |
| 7 | 9 | Change "valve" to --valves--. |
| 7 | 26 | After "such" insert --as--. |
| 8 | 5 | Change "chive" to --drive--. |
| 8 | 32 | Change "μv1 – uv1" to --uv1 – uv4-- |
| 8 | 39 | Delete "it". |
| 9 | 39 | Change "inductive of" to --conducive to--. |

Signed and Sealed this

First Day of May, 2001

Attest:

NICHOLAS P. GODICI

Attesting Officer     Acting Director of the United States Patent and Trademark Office